UNITED STATES PATENT OFFICE.

JAROSLAV MUHLBAUER, OF PRAGUE, AUSTRIA-HUNGARY.

PROCESS OF PRODUCING MINIUM.

1,059,195. Specification of Letters Patent. Patented Apr. 15, 1913.

No Drawing. Application filed November 18, 1911. Serial No. 661,127.

*To all whom it may concern:*

Be it known that I, JAROSLAV MUHLBAUER, a citizen of the Empire of Austria-Hungary, residing at Prague, in the Empire of Austria-Hungary, have invented certain new and useful Improvements in the Process of Producing Minium; and I do hereby declare the following to be a full, clear, and exact description of the invention, such as will enable others skilled in the art to which it appertains to make and use the same.

My invention relates to improvements in the process of producing minium.

Heretofore minium has ordinarily been produced by roasting oxid or carbonate of lead. This process is objectionable, because the oxidation is carried out very slowly, so that even thin layers of the oxid must be roasted from 24 to 28 hours before a useful product is obtained. For this reason the efforts of those skilled in the art have for a long time been directed to finding a process by which the same result is obtained within a shorter time, and it has been tried to render the reaction more speedy by means of catalytic substances. However there experiments have not been successful, because catalytic substances suitable for the process have not been found. Furthermore experiments have shown, that the reaction can not be made more speedy by increasing the temperature.

I have discovered, that the time required for the reaction can considerably be shortened by increasing the pressure of the reacting oxygen of the air. And my invention consists in roasting the lead compound under pressure.

In carrying out my improved process a lead compound such as oxid of lead is heated within iron tubes at a temperature of 460° centigrade and under pressure. For example, if the process is carried out at a pressure of 12 atmospheres, within one hour a product is obtained which contains 60 per cent. of $Pb_3O_4$, while under atmospheric pressure at least fifteen hours would be necessary to obtain the same result. If the raw material is heated in the presence of pure oxygen and at a pressure of 12 atmospheres, only a few minutes are required to obtain a product of the same percentage of $Pb_3O_4$.

Claims:—

1. The herein described process of producing minium, which consists in heating oxid of lead containing materials in the presence of an oxidizing medium under pressure.

2. The herein described process of producing minium, which consists in heating oxid of lead containing materials in the presence of a mixture containing oxygen under pressure.

3. The herein described process of producing minium, which consists in heating oxid of lead containing materials in the presence of oxygen under pressure.

JAROSLAV MUHLBAUER.

Witnesses:
FERDINAND SCHULZ,
JOSEF URBAN.